F. LUNKENHEIMER.

GLOBE VALVE.

No. 10,010. Reissued Jan. 17, 1882.

Inventor

Frederick Lunkenheimer

By John W. Hill

Attorney

Attest

Edgar J. Gross

[illegible]

UNITED STATES PATENT OFFICE.

FREDERICK LUNKENHEIMER, OF CINCINNATI, OHIO.

GLOBE-VALVE.

SPECIFICATION forming part of Reissued Letters Patent No. 10,010, dated January 17, 1882.

Original No. 166,393, dated August 3, 1875. Application for reissue filed October 5, 1881.

*To all whom it may concern:*

Be it known that I, FREDERICK LUNKENHEIMER, of Cincinnati, county of Hamilton, and State of Ohio, have invented an Improvement in Globe-Valves, of which the following is a specification.

My invention relates to that construction of globe-valve or stop-cock whose valve proper has a swiveling connection with its stem, so that it cannot revolve on its seat when being opened and closed; and my invention consists of a peculiar device for securing the valve rigidly to the stem when it is necessary to prevent it swiveling in order to permit of the grinding of the valve on its seat by the use of the stem and hand-wheel.

Figure 1:
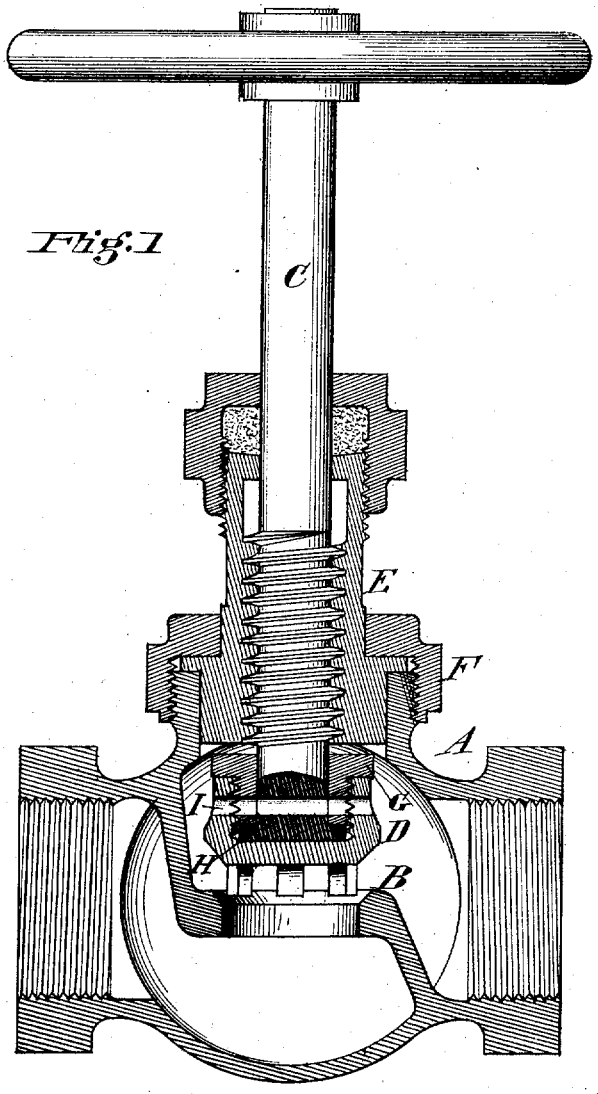
Figure 2:
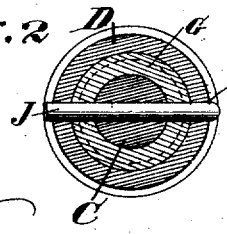

Figure 1 is an axial section of a globe-valve embodying my invention. Fig. 2 is a cross-section through the valve and stem.

A is the case or shell; B, the seat of the same; C, the valve-stem; and D, the valve. The nut E, through which the screw-threaded stem of the valve operates, is fitted, as shown in the drawings and in a previous patent of mine, into the case and secured by nut F to render it a fixture when the valve is in use, and adapt it for release (so that it may revolve with the stem and the latter be prevented from rising and falling) when the valve is being ground. The valve D is recessed on top and screw-threaded in the recess for the occupancy of an annular nut, G, which confines the collar H, secured to the bottom of the valve-stem. This connection permits the valve to swivel freely on the stem, or rather it permits the stem to rotate in the valve, so that the latter may not rotate when seating or unseating.

In order to connect the valve rigidly to its stem, and secure it in proper position when it is necessary to grind the valve, I provide a smooth passage or hole, I, diametrically through valve, nut, and stem, for the introduction of a smooth pin, J, of any kind, or of any convenient material—as, for example, a common match may be inserted therein and serve to keep the valve and stem rigidly together, and when the grinding is accomplished the match may be broken off by the forcible closing of the valve, or the pin J may be removed after grinding and before the nut G is secured for use.

It is obvious that my invention is applicable to other forms of loose-disk globe-valves than the one shown, and that the essential requisite is the transverse smooth passage or hole I through the stem C, for the reception of the removable smooth pin J, whereby the loose or swiveling valve D is caused to rotate with the stem C, either to the right or left, in regrinding the valve on its seat.

What I claim is—

1. In a regrinding globe-valve, a valve having a swiveled connection with the end of a valve-stem, both the valve and the stem being provided with a transverse smooth passage or hole for the insertion of a smooth frangible pin to temporarily lock the valve and stem immovably together, said pin being capable of fracture by the forcible closing of the valve after the latter has been reground, all substantially as and for the purpose described.

2. The combination of the collared stem C H, nut G, and valve D, all perforated, as described, for the insertion of the pin J through each one of said elements, substantially as described.

In testimony whereof I have signed my name to the foregoing specification in the presence of two subscribing witnesses.

FREDERICK LUNKENHEIMER.

Witnesses:

EDGAR J. GROSS,

ROBT. T. HUTTON.